United States Patent
Kim et al.

(10) Patent No.: US 8,375,080 B2
(45) Date of Patent: Feb. 12, 2013

(54) METHOD AND APPARATUS FOR TRANSMITTING AND RECEIVING FILTERED CONTENT BASED ON AGE LIMIT

(75) Inventors: Il-joo Kim, Seoul (KR); Ho Jin, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 162 days.

(21) Appl. No.: 12/478,167

(22) Filed: Jun. 4, 2009

(65) Prior Publication Data

US 2009/0307310 A1 Dec. 10, 2009

Related U.S. Application Data

(60) Provisional application No. 61/058,605, filed on Jun. 4, 2008.

(30) Foreign Application Priority Data

Apr. 28, 2009 (WO) ............... PCT/KR2009/002197

(51) Int. Cl.
- G06F 15/16 (2006.01)
- G06F 15/173 (2006.01)
- H04N 7/16 (2011.01)
- H04N 7/173 (2011.01)

(52) U.S. Cl. ........ 709/203; 709/230; 709/223; 725/135; 725/93

(58) Field of Classification Search ............... 709/203, 709/225, 229, 230, 232; 725/39, 109, 86, 725/93; 726/4
See application file for complete search history.

(56) References Cited

U.S. PATENT DOCUMENTS

| | | | |
|---|---|---|---|
| 7,069,332 B2* | 6/2006 | Shibata et al. | 709/231 |
| 7,428,585 B1* | 9/2008 | Owens et al. | 709/223 |
| 2001/0018772 A1* | 8/2001 | Shibata et al. | 725/93 |
| 2001/0042128 A1* | 11/2001 | Hirayama | 709/231 |
| 2002/0049806 A1* | 4/2002 | Gatz et al. | 709/203 |
| 2002/0073421 A1 | 6/2002 | Levitan et al. | |
| 2004/0006621 A1 | 1/2004 | Bellinson et al. | |
| 2005/0015453 A1 | 1/2005 | Chin et al. | |
| 2005/0135264 A1* | 6/2005 | Popoff et al. | 370/252 |
| 2006/0031870 A1 | 2/2006 | Jarman et al. | |
| 2006/0130119 A1* | 6/2006 | Candelore et al. | 725/135 |
| 2007/0156871 A1* | 7/2007 | Braun et al. | 709/223 |
| 2008/0046544 A1 | 2/2008 | Sakoh et al. | |

(Continued)

FOREIGN PATENT DOCUMENTS

| | | |
|---|---|---|
| EP | 1126712 A2 | 8/2001 |
| EP | 2063633 A1 | 5/2009 |

(Continued)

OTHER PUBLICATIONS

Extended European Search Report, dated Oct. 21, 2011, issued by the European Patent Office in counterpart European Application No. 09758474.2

(Continued)

Primary Examiner — Joseph Avellino
Assistant Examiner — Aftab Nasir Khan
(74) Attorney, Agent, or Firm — Sughrue Mion, PLLC (57) ABSTRACT

A method and apparatus for transmitting and receiving filtered content based on an age limit. A client transmits to a server a content request message requesting original content, part of which is blocked due to an age limit, and receives from the server filtered content according to the age limit in response to the content request message.

9 Claims, 6 Drawing Sheets

U.S. PATENT DOCUMENTS

| | | | |
|---|---|---|---|
| 2008/0052639 A1 | 2/2008 | Chun et al. | |
| 2008/0109823 A1 | 5/2008 | Whitfield et al. | |
| 2009/0083646 A1* | 3/2009 | Lin et al. | 715/769 |
| 2009/0100147 A1 | 4/2009 | Igarashi | |
| 2009/0172737 A1* | 7/2009 | Miki | 725/46 |
| 2009/0180484 A1 | 7/2009 | Igarashi | |
| 2009/0193469 A1 | 7/2009 | Igarashi | |
| 2009/0222514 A1 | 9/2009 | Igarashi | |
| 2009/0235317 A1 | 9/2009 | Igarashi | |
| 2009/0248882 A1* | 10/2009 | Takagi et al. | 709/229 |
| 2009/0300673 A1 | 12/2009 | Bachet et al. | |
| 2010/0192233 A1* | 7/2010 | Tanikawa | 726/28 |

FOREIGN PATENT DOCUMENTS

| | | |
|---|---|---|
| JP | 2001-61112 A | 3/2001 |
| JP | 2001-350760 A | 12/2001 |
| JP | 2001350760 * | 12/2001 |
| KR | 1999-026846 A | 4/1999 |
| KR | 10-2005-0073126 A | 7/2005 |
| KR | 10-2007-0021610 A | 2/2007 |
| WO | WO 2005/065166 A2 | 7/2005 |
| WO | 2007/102549 A1 | 9/2007 |
| WO | 2007/117613 A2 | 10/2007 |
| WO | WO 2008/012488 A2 | 1/2008 |

OTHER PUBLICATIONS

Extended European Search Report, dated Oct. 25, 2011, issued by the European Patent Office in counterpart European Application No. 09758521.0.

* cited by examiner

```
<?xml version="1.0"encoding="UTF-8"?>
<!DOCTYPE html PUBLIC "-//W3C//DTD XHTML 1.0
Transitional//EN""http://www.w3.org/TR/xhtml1/DTD/xhtml1-transitional.dtd">
<html xmlns="http://www.w3.org/1999/xhtml">
    <head>
        <title> Kids Lock Content </title>
        < object id="KidsLock" type="application/KidsLock"/>
        <script type="text/javascript">
        <!-- function HandleKidsLock()
        {
            if(KidsLock.status == PG_12)
                {
                new_window =
open("http://www.testwebserver/Teenage.html","displayWindow","width=700,height=450,left=250,top=20");
                }
                else
                {
                new_window =
open("http://www.testwebserver/Adult.html","displayWindow","width=700,height=450,left=250,top=20");
                }
        }
        -->
        </script>
    </head>
    <body onload="HandleKidsLock()">
            <p><img src="title_pic.jpg" width="441" height="85" border="0" alt='title_pic.jpg"></p>
    </body>
</html>
```

METHOD AND APPARATUS FOR TRANSMITTING AND RECEIVING FILTERED CONTENT BASED ON AGE LIMIT

CROSS-REFERENCE TO RELATED PATENT APPLICATION

This application claims priority from International Application No. PCT/KR2009/002197, filed on Apr. 28, 2009, and U.S. Provisional Application No. 61/058,605, filed on Jun. 4, 2008, the disclosures of which are incorporated herein by reference.

BACKGROUND OF THE INVENTION

1. Field of the Invention

Apparatuses and methods consistent with the present invention relate to transmitting and receiving content, and more particularly, to receiving filtered content from a server based on an age limit set by a client receiving the content.

2. Description of the Related Art

As use of digital content applications has increased considerably, age-based methods of restricting access to different types of content have been developed in order to protect children and minors from exposure to content including sexual or violent images or other types of mature content.

In this regard, various content rating systems, for example, a television rating system or a motion picture rating system for categorizing content recorded on a recording medium such as a digital video disk (DVD) or a compact disk (CD), have been employed.

However, such related art methods not only prevent children and minors from watching scenes that include mature content but also prevent watching of the entire content.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Exemplary embodiments of the present invention provide a method and apparatus for transmitting and receiving filtered content based on an age limit set by a client receiving the content, and a computer-readable recording medium having embodied thereon a program for executing the method.

According to an aspect of the present invention, there is provided a method of receiving content from a server, wherein the receiving is performed by a client, the method including: transmitting to the server a content request message requesting original content, and including information about an age limit set by the client; and receiving from the server filtered content according to the information about the age limit in response to the content request message, wherein the filtered content is obtained by changing part of the original content according to the information about the age limit.

The filtered content may be obtained by removing part of the original content according to the information about the age limit.

The filtered content may be obtained by replacing part of the original content with other content according to the information about the age limit.

The content request message may be a HyperText Transfer Protocol (HTTP) request message, and the information about the age limit may be included in a header of the HTTP request message.

According to another aspect of the present invention, there is provided a method of transmitting content to a client, wherein the transmitting is performed by a server, the method including: receiving from the client a content request message requesting original content and including information about an age limit set by the client; and transmitting to the client filtered content according to the information about the age limit, wherein the filtered content is obtained by changing part of the original content according to the information about the age limit.

The transmitting of the filtered content to the client may include: selecting filtered content to be transmitted to the client from among a plurality of pieces of filtered content which are divided according to age limit ratings based on the information about the age limit that is received from the client; and transmitting the selected filtered content to the client.

The transmitting of the filtered content to the client may include: generating filtered content based on the information about the age limit that is received from the client; and transmitting the generated filtered content to the client.

According to another aspect of the present invention, there is provided an apparatus for receiving content, wherein the receiving is performed by a client, the apparatus including: a content requesting unit transmitting to a server a content request message requesting original content and including information about an age limit set by the client; a content receiving unit receiving from the server filtered content according to the information about the age limit in response to the content request message; and a content rendering unit rendering the filtered content, wherein the filtered content is obtained by changing part of the original content according to the information about the age limit.

According to another aspect of the present invention, there is provided an apparatus for transmitting content, wherein the transmitting is performed by a server, the apparatus including: a request receiving unit receiving from a client a content request message requesting original content and including information about an age limit set by the client; and a content transmitting unit transmitting to the client filtered content according to the information about the age limit, wherein the filtered content is obtained by changing part of the original content according to the information about the age limit.

According to another aspect of the present invention, there is provided a computer-readable recording medium having embodied thereon a program for executing the methods.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE INVENTION

Exemplary embodiments of the present invention will now be described more fully with reference to the accompanying drawings, in which like reference numerals denote like elements.

Figure 1:
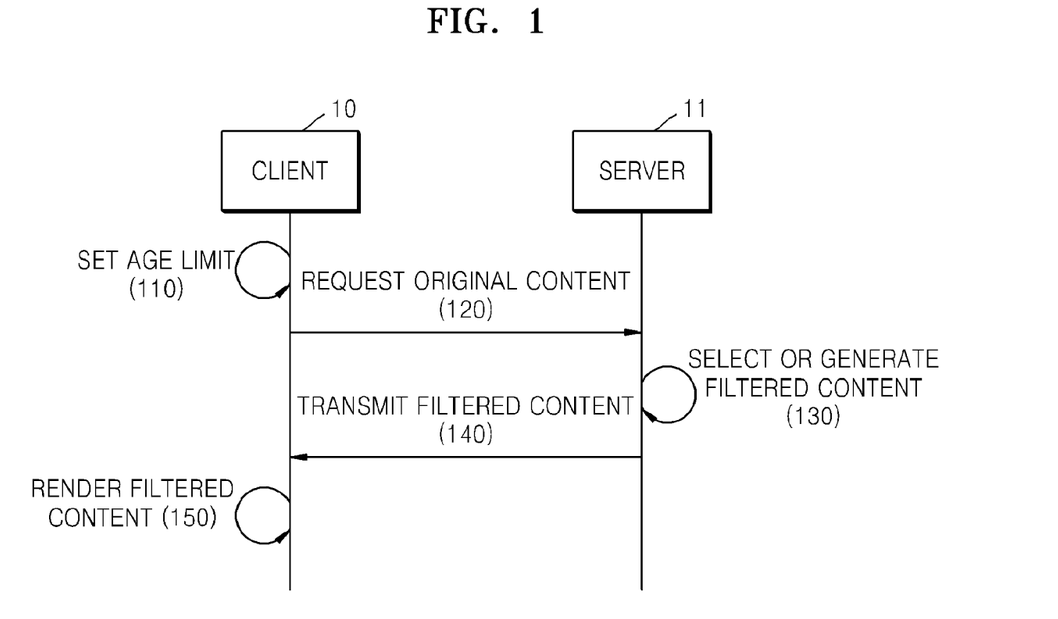
FIG. 1 is a flowchart illustrating a method of transmitting and receiving content, according to an exemplary embodiment of the present invention.

FIG. 1 is a flowchart illustrating a method of transmitting and receiving content, according to an exemplary embodiment of the present invention.

Referring to FIG. 1, a client 10 requests a server 11 to transmit predetermined content and receives the predetermined content from the server 11. The predetermined content may be distributed using Internet protocol television (IPTV) service. In this case, the client 10 may be a set-top box, and the server 11 may be a content server operated by an IPTV service provider.

In operation 110, the client 10 sets an age limit. The client 10 sets the age limit via an age limit application installed in the client 10. For example, among pieces of content received from the server 11, the client 10 sets a rating for each content that is suitable for people under the age of 12, 15, or 18.

In operation 120, in order to request original content, the client 10 transmits to the server 11 a content request message including information about the age limit set by the client 10 in operation 110. Since the information about the age limit is also transmitted when the content request message is transmitted to the server 11, the server 11 can provide content complying with the age limit set by the client 10.

If the content request message is a hypertext transfer protocol (HTTP) request message, the information about the age limit is included in a header of the HTTP request message and then is transmitted to the server 11.

For example, the information about the age limit set by the client 10 may be included in the header of the HTTP request message that is obtained by an HTTP GET method, and then may be transmitted to the server 11.

In operation 130, the server 11 selects or generates filtered content according to the information about the age limit that is received from the client 10 in operation 120. The filtered content is obtained by changing part of the original content according to the information about the age limit received in operation 120, which is explained in detail below with reference to FIGS. 2A, 2B, 2C, 3A, 3B, and 4.

Figure 2A:
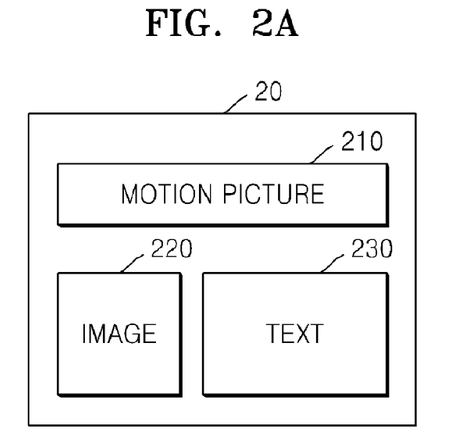
FIGS. 2A, 2B, and 2C illustrate original content and a plurality of filtered pieces of content, according to an exemplary embodiment of the present invention.
Figure 2B:
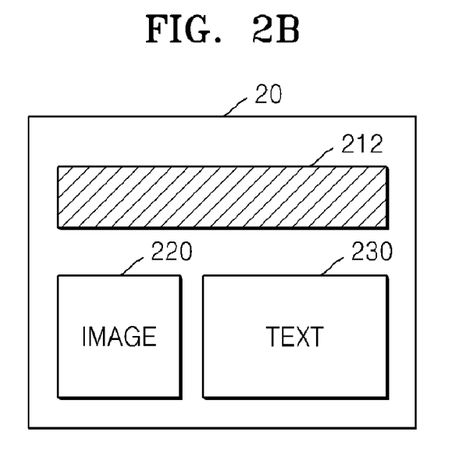
Figure 2C:
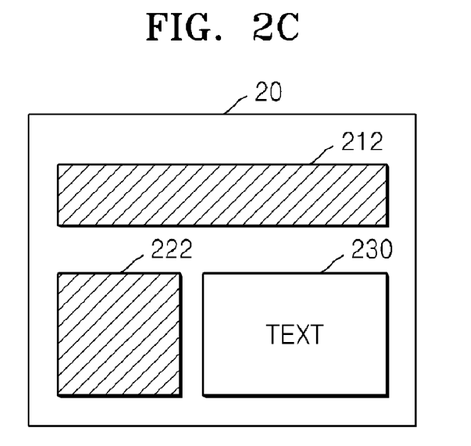

FIGS. 2A, 2B, and 2C illustrate original content and a plurality of filtered pieces of content, according to an exemplary embodiment of the present invention. In FIGS. 2A, 2B, and 2C, content requested by the client 10 and provided by the server 11 is web content.

Referring to FIG. 2A, original web content 20 provided by the server 11 may include a plurality of objects, e.g., a motion picture 210, an image 220, and a text 230. In other words, the original web content 20 may include all of the motion picture 210, the image 220, and the text 230.

If the motion picture 210, which is part of the original web content 20, cannot be provided to the client 10 due to the age limit, as shown in FIG. 2B, only the motion picture 212 is filtered to be removed from the original web content 20 or to be replaced with another motion picture.

Likewise, if the motion picture 210 and the image 220, which are part of the original web content 20, cannot be provided to the client 10 due to the age limit, as shown in FIG. 2C, the motion picture 212 and the image 222 are filtered to be removed from the original web content 20 or to be replaced with another motion picture and another image.

If the client 10 transmits the content request message requesting the original web content 20 in operation 120, the method proceeds to operation 130. In operation 130, the server 11 may select filtered web content complying with the information about the age limit included in the content request message from web contents of FIGS. 2A, 2B, and 2C. The server 11, which previously generates and stores the web contents of FIGS. 2A through 2C, selects upon receiving the content request message from the client 10 one of the pieces of web content of FIGS. 2A, 2B, and 2C with reference to the information about the age limit.

Alternatively, after receiving the content request message from the client 10 in operation 120, the server 11 may dynamically generate filtered web content (operation 130). In other words, after receiving the content request message from the client 10 in operation 12, the server 11 generates the web content of FIG. 2B or 2C.

Figure 3A:
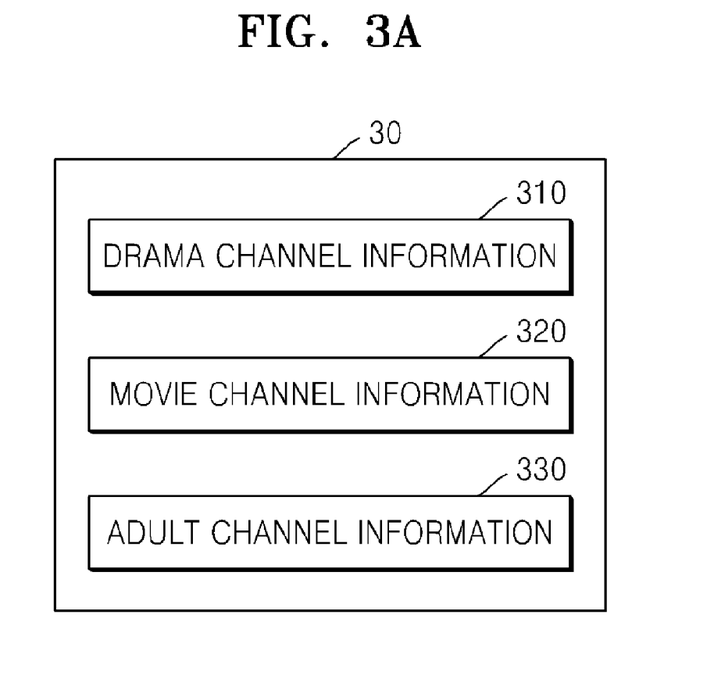
FIGS. 3A and 3B illustrate original content and filtered content, according to another exemplary embodiment of the present invention.
Figure 3B:
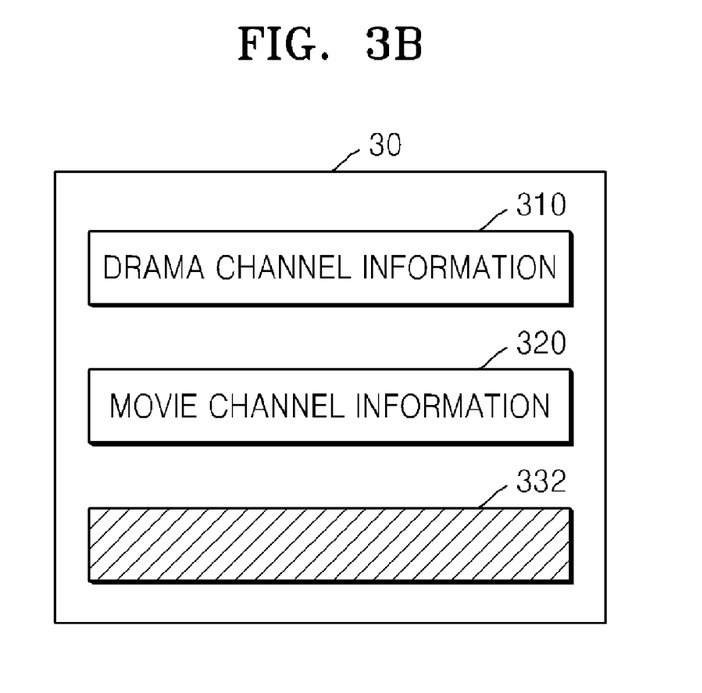

FIGS. 3A and 3B illustrate original content and filtered content, according to another exemplary embodiment of the present invention.

In FIGS. 3A and 3B, objects included in original web content 30 are the same type of objects, and some of the objects are filtered.

Referring to FIG. 3A, the original web content 30 provided by the server 10 may include a drama channel information 310 about drama channels, a movie channel information 320 about movie channels, and an adult channel information 330 about adult channels. The drama channel information 310, the movie channel information 320, and the adult channel information 330 are the same type of objects, for example, a motion picture, an image, or a text.

Referring to FIG. 3B, from the drama channel information 310, the movie channel information 320, and the adult channel information 330, according to the information about the age limit of the client 11, the adult channel information 330 may be filtered to be removed from the original web content 30 or to be replaced with other information.

In the same manner as described with reference to FIGS. 2A, 2B, and 2C, if the client 10 transmits the content request message requesting the original web content 30 in operation 120, the method proceeds to operation 130. In operation 130, the server 11 selects filtered web content complying with the information about the age limit included in the content request message from the web contents of FIGS. 3A and 3B. Alternatively, the server may dynamically generate filtered web content when receiving the content request message from the client 10.

Figure 4:
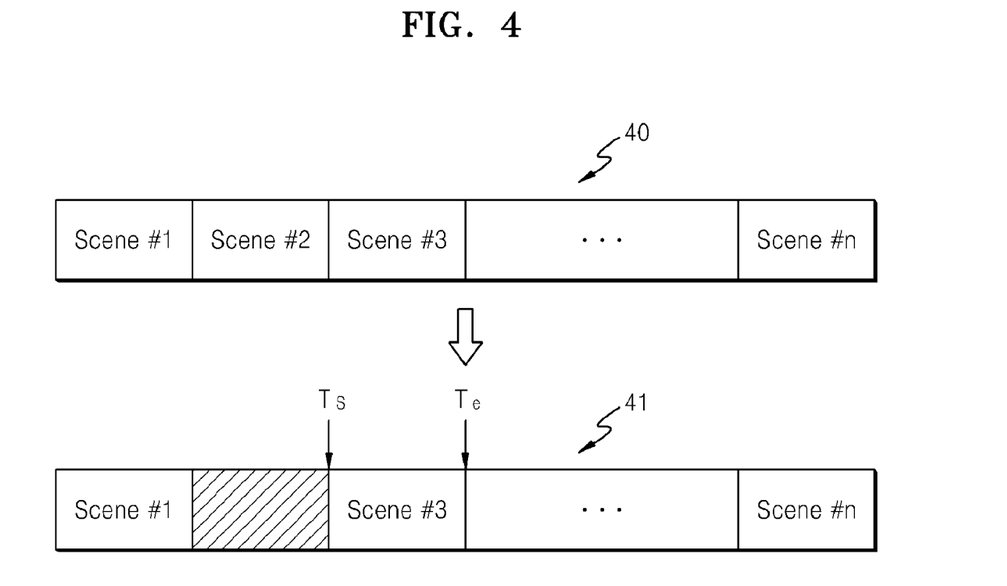
FIG. 4 illustrates original content and pieces of filtered content, according to another exemplary embodiment of the present invention.

FIG. 4 illustrates original content and filtered content, according to another exemplary embodiment of the present invention. In FIG. 4, content requested by the client 10 and provided by the server 11 is not web content.

Referring to FIG. 4, original motion picture content 40 includes a plurality of scenes Scene #1 through Scene #n. If part of the original motion picture content 40, for example, only the second scene Scene #2, needs to be filtered due to the age limit, the second scene Scene #2 may be removed or replaced with another scene.

If the client 10 transmits the content request message requesting the original motion picture content 40 in operation 120, the method proceeds to operation 130. In operation 130, the server 11 selects filtered content complying with the information about the age limit included in the content request message from among the pieces of motion picture content of FIG. 4, or dynamically generates filtered content when receiving the content request message.

Although the content is motion picture content in FIG. 4, it is to be understood by one of ordinary skill in the art that exemplary embodiments of the present invention are not limited thereto and other types of content may be used. For example, the content may be image content and only part of the image content may be removed or replaced with another image.

In operation 140, the server 11 transmits the filtered content, which is filtered according to the age limit, to the client 10. The server 11 transmits the filtered content, which is selected from among the plurality of pieces of filtered content or is dynamically generated in operation 130, to the client 11 in operation 140.

In operation 150, the client 10 renders the filtered content received in operation 140. If the filtered content is web content, the client 10 displays the filtered content using a browser, and if the filtered content is a motion picture, the client 10 reproduces the filtered content using a motion picture reproduction application.

Figure 5:
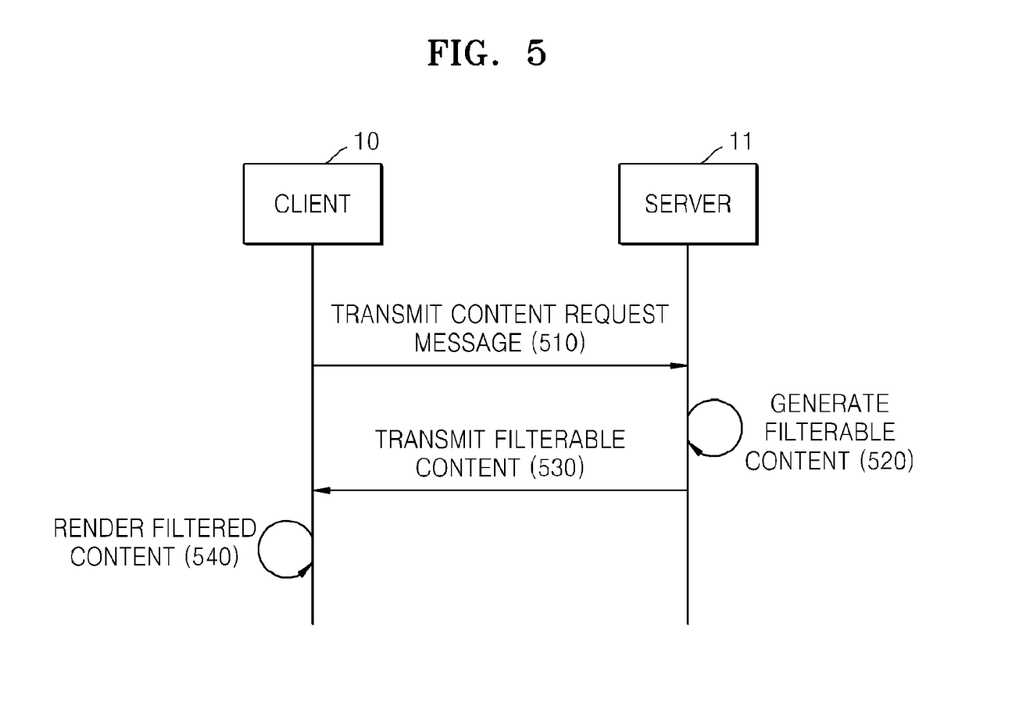
FIG. 5 is a flowchart illustrating a method of transmitting and receiving content, according to another exemplary embodiment of the present invention.

FIG. 5 is a flowchart illustrating a method of transmitting and receiving content, according to another exemplary embodiment of the present invention.

In operation 510, the client 10 transmits a content request message to the server 11. The content request message may be an HTTP request message that is obtained by an HTTP GET method.

In operation 520, the server 11 generates filterable content including information that is necessary for the client 10 to dynamically create content according to the age limit set by the client 10.

Unlike the filtered web pieces of content of FIGS. 2A, 2B, and 2C that are generated and transmitted by the server 11, filterable content including information about a dynamic configuration of web content according to the age limit is generated so that the client 10 removes or replaces part of objects of the web content to create filtered web content, which is explained in detail below with reference to FIG. 6.

Figure 6:
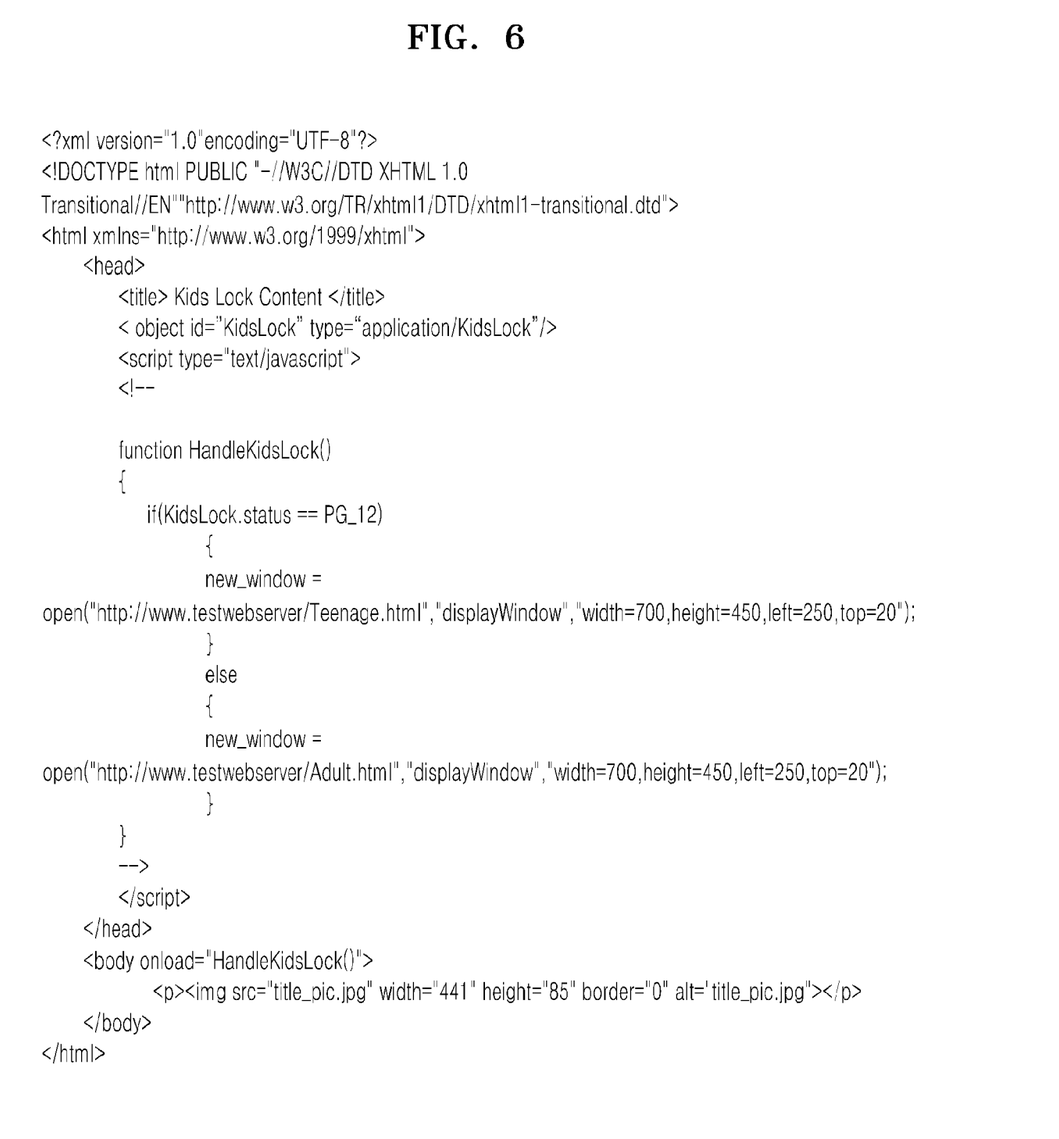
FIG. 6 illustrates filterable content according to an exemplary embodiment of the present invention.

FIG. 6 illustrates filterable content according to an exemplary embodiment of the present invention.

In FIG. 6, the filterable content generated in operation 520 is HyperText Markup Language (HTML) web content. Referring to FIG. 6, the filterable content includes a JavaScript so that the client 10 can filter the filterable content. Filtered pieces of web content having different addresses according to the age limit may be rendered by using the browser.

If the age limit is 12 years old, web content from the address "http://www.testwebserver/Teenage.html" is rendered, and if there is no age limit, web content from the address of "http://www.testwebserver/Adult.html" is rendered.

Referring to FIG. 5 again, in operation 530, the server 11 transmits the filterable content, which is generated in operation 520, to the client 10.

In operation 540, the client 10 renders the filterable content received in operation 530. In detail, in operation 540, the client 10 filters the filterable content received in operation 530 and renders the filtered content with reference to the information about the age limit set by the client 10. The filterable web content generated as shown in FIG. 6 is filtered by using a plug in or browser embedded object designed for filtering, and then is rendered.

Figure 7:
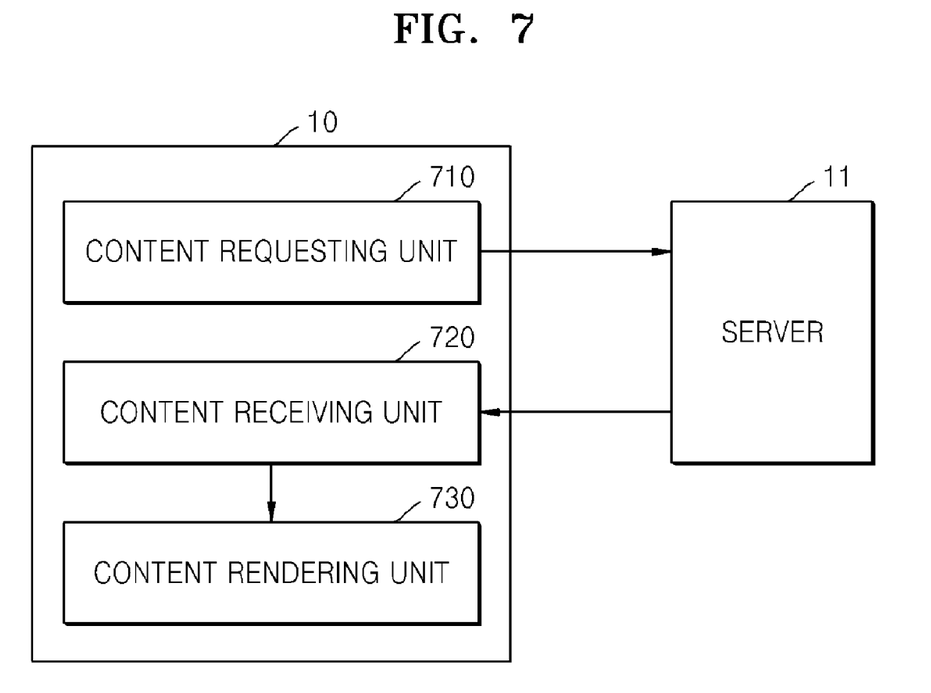
FIG. 7 illustrates an apparatus for receiving content, according to an exemplary embodiment of the present invention.

FIG. 7 illustrates an apparatus for receiving content, according to an exemplary embodiment of the present invention.

Referring to FIG. 7, the apparatus includes a content requesting unit 710, a content receiving unit 720, and a content rendering unit 730.

The content requesting unit 710 transmits a content request message to the server 11. The content request message may include information about the age limit set by the client 10. The content request message may be an HTTP request message, and the information about the age limit may be included in a header of the HTTP request message.

The content receiving unit 720 receives content transmitted by the server 11 in response to the content request message transmitted by the content requesting unit 710. The content received by the content receiving unit 720 may be filtered content obtained by filtering part of original content according to the information about the age limit as previously described with reference to operation 130 of FIG. 1. Alternatively, the content received by the content receiving unit 720 may be filterable content that can be filtered according to the information about the age limit as previously described with reference to FIG. 5.

The filtered content is obtained by removing or replacing part of the original content as previously described in detail with reference to FIGS. 2A, 2B, 2C, 3A, 3B, and 4. The filterable content may be content selected from among a plurality of pieces of filtered content that are previously generated by the server 11, or a content dynamically generated by the server 11 in response to the content request message of the client 10.

The filterable content includes information that is necessary for the content rendering unit 730 to dynamically create filtered content as described with reference to FIG. 6.

The content rendering unit 730 renders the content received by the content receiving unit 720. If the content received by the content receiving unit 720 is web content, the content rendering unit 730 may be a module for driving the browser.

If the content received by the content receiving unit 720 is filtered content filtered by the server 11, the content rendering unit 730 renders the received content.

If the content received by the content receiving unit 720 is filterable content, the content rendering unit 730 filters the filterable content with reference to the information about the age limit set by the client 10, and renders the filtered content.

Figure 8:
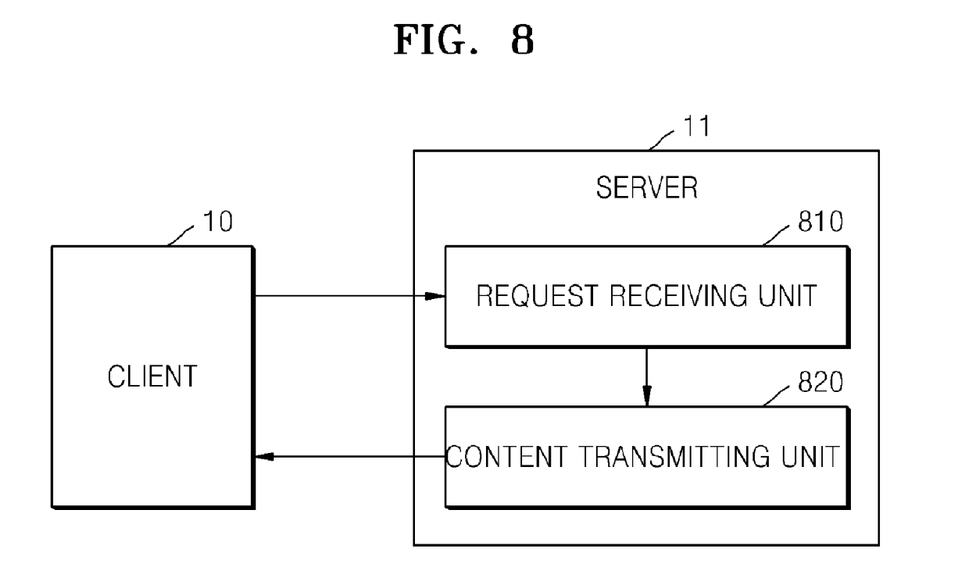
FIG. 8 illustrates an apparatus for transmitting content, according to an exemplary embodiment of the present invention.

FIG. 8 illustrates an apparatus for transmitting content, according to an exemplary embodiment of the present invention.

Referring to FIG. 8, the apparatus includes a request receiving unit 810 and a content transmitting unit 820.

The request receiving unit 810 receives a content request message from the client 10. The content request message may include the information about the age limit set by the client 10. If the content request message is an HTTP request message, the information about the age limit may be included in a header of the HTTP request message.

The content transmitting unit 820 transmits content to the client 10 in response to the content request message received by the request receiving unit 810. The content transmitting unit 820 transmits filtered content or filterable content to the client 10.

The content transmitting unit 820 may select, from among a plurality of previously generated pieces of filtered content, filtered content complying with the information about the age limit received by the request receiving unit 810 and transmit the selected filtered content to the client 10, or may dynamically generate filtered content complying with the information about the age limit received by the request receiving unit 810 and transmit the generated filtered content to the client 10. Alternatively, the content transmitting unit 820 may transmit filterable content to the client 10 so that the client 10 can directly filter the filterable content according to the age limit.

In a related art method, content that is not suitable due to an age limit is blocked entirely. However, according to exemplary embodiments of the present invention, only those parts of the content which are not suitable are filtered. The other parts of the content which are appropriate to the age-limit are rendered. Accordingly, content utilization efficiency can be improved and thus content-related applications can increase.

While the present invention has been particularly shown and described with reference to exemplary embodiments thereof using specific terms, the embodiments and terms have been used to explain the present invention and should not be construed as limiting the scope of the present invention defined by the claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention. Also, exemplary embodiments of the present invention may be embodied as computer-readable codes on a computer-readable recording medium.

For example, the apparatus for receiving content illustrated in FIG. 6 and the apparatus for transmitting content illustrated in FIG. 7 may include a bus coupled to units thereof and at least one processor coupled to the bus, and also may include a memory coupled to the bus in order to store commands, received messages, or generated messages, and coupled to the at least one processor in order to implement the commands.

The computer-readable recording medium is any data storage device that can store data which can be thereafter read by a computer system. Examples of the computer-readable recording medium include read-only memories (ROMs), random-access memories (RAMs), CD-ROMs, magnetic tapes, floppy disks, and optical data storage devices. The computer-readable recording medium can also be distributed over network coupled computer systems so that the compute readable code is stored and executed in a distributed fashion.

What is claimed is:

1. A method of receiving content from a server by a client, the method comprising:

transmitting to the server a content request message requesting original web content and including age limit information about an age limit set by the client wherein the content request message is a HyperText Transfer Protocol (HTTP) request message, and the age limit information is included in a header of the HTTP request message; and dynamically generating by the server filtered pieces of web content wherein the filtered pieces of web content are generated by changing part of the original content according to the age limit information either by removing or replacing part of the original web content wherein the filtered pieces of web content being generated include HyperText Markup Language (HTML) content and filtered pieces of web content may be selected from among plurality of pieces of filtered web content;

receiving from the server filtered pieces of web content according to the age limit information in response to the content request message wherein the web content includes JavaScript enabling the client to filter the pieces of web content, wherein the filtered pieces of web content have different location address from the original content on the server;

the filtered content and the original pieces of web content are selectively rendered using a browser of the client.

2. A method of transmitting content to a client by a server, the method comprising:

receiving from the client a content request message requesting original web content and including age limit information about an age limit set by the client wherein the content request message is a HyperText Transfer Protocol (HTTP) request message, and the age limit information is included in a header of the HTTP request message; and transmitting to the client filtered content according to the age limit information in response to the content request message, dynamically generating by the server filtered pieces of web content wherein the filtered pieces of web content are generated by changing part of the original content according to the age limit information either by removing or replacing part of the original web content wherein the filtered pieces of web content being generated include HyperText Markup Language (HTML) content and filtered pieces of web content may be selected from among plurality of pieces of filtered web content, wherein the filtered pieces of web content have a different location address from the original content on the server, and the filtered content and the original pieces of web content are selectively rendered using a browser of the client.

3. The method of claim 2, wherein the transmitting the filtered content to the client comprises:

selecting filtered content to be transmitted to the client from among a plurality of filtered content which is divided according to age limit ratings based on the age limit information that is received from the client; and transmitting the selected filtered content to the client.

4. A client apparatus for receiving content, the client apparatus comprising:

a processor;

a memory for storing web content;

a content requesting unit that transmits to a server a content request message requesting original web content and including age limit information, wherein the content request message is a HyperText Transfer Protocol (HTTP) request message, and the age limit information is included in a header of the HTTP request message;

a content receiving unit that receives from the server filtered content according to the age limit information in response to the content request message; and a content rendering unit that renders the filtered content, dynamically generating by the server filtered pieces of web content, wherein the filtered pieces of web content are generated by changing part of the original content according to the age limit information either by removing or replacing part of the original web content wherein the filtered pieces of web content being generated include HyperText Markup Language (HTML) content and filtered pieces of web content may be selected from among plurality of pieces of filtered web content, wherein the filtered pieces of web content have a different location address from the original content on the server, and the filtered content and the original pieces of web content are selectively rendered using a browser of the client.

5. A server apparatus for transmitting content, the apparatus comprising:
a processor;
a memory for storing web content;
a request receiving unit that receives from a client a content request message requesting original web content and including age limit information about an age limit set by the client, wherein the content request message is a HyperText Transfer Protocol (HTTP) request message, and the age limit information is included in a header of the HTTP request message; and
a content transmitting unit that transmits to the client filtered content according to the age limit information in response to the content request message,
dynamically generating by the server filtered pieces of web content wherein the filtered pieces of web content are obtained by changing part of the original content according to the age limit information either by removing or replacing part of the original web content wherein the filtered pieces of web content being generated include HyperText Markup Language (HTML) content and filtered pieces of web content may be selected from among plurality of pieces of filtered web content,
wherein the filtered web content have a different location address from the original content on a content server, and the filtered content and the original pieces of web content are selectively rendered using a browser of the client.

6. The apparatus of claim 5, wherein the content transmitting unit selects filtered content to be transmitted to the client from among a plurality of filtered content which is divided according to age limit ratings based on the age limit information, and transmits the selected filtered content to the client.

7. The apparatus of claim 5, wherein the content transmitting unit generates filtered content based on the age limit information that is received from the client, and transmits the generated filtered content to the client.

8. A non-transitory computer-readable recording medium having embodied thereon a program for executing a method the method comprising:
transmitting to the server a content request message requesting original web content and including age limit information about an age limit set by the client wherein the content request message is a HyperText Transfer Protocol (HTTP) request message, and the age limit information is included in a header of the HTTP request message; and
dynamically generating by the server filtered pieces of web content wherein the filtered pieces of web content are generated by changing part of the original content according to the age limit information either by removing or replacing part of the original web content wherein the filtered pieces of web content being generated include HyperText Markup Language (HTML) content and filtered pieces of web content may be selected from among plurality of pieces of filtered web content;
receiving from the server filtered pieces of web content according to the age limit information in response to the content request message wherein the web content includes JavaScript enabling the client to filter the pieces of web content, wherein the filtered pieces of web content have different location address from the original content on the server;
the filtered content and the original pieces of web content are selectively rendered using a browser of the client.

9. A non-transitory computer-readable recording medium having embodied thereon a program for executing a method, the method comprising:
receiving from the client a content request message requesting original web content and including age limit information about an age limit set by the client wherein the content request message is a HyperText Transfer Protocol (HTTP) request message, and the age limit information is included in a header of the HTTP request message; and
transmitting to the client filtered content according to the age limit information in response to the content request message,
dynamically generating by the server filtered pieces of web content wherein the filtered pieces of web content are generated by changing part of the original content according to the age limit information either by removing or replacing part of the original web content wherein the filtered pieces of web content being generated include HyperText Markup Language (HTML) content and filtered pieces of web content may be selected from among plurality of pieces of filtered web content,
wherein the filtered pieces of web content have a different location address from the original content on the server, and the filtered content and the original pieces of web content are selectively rendered using a browser of the client.

* * * * *